Nov. 8, 1955   P. J. CELANI   2,723,180
FEEDING GRANULAR PARTICLES INTO A GAS LIFT
Filed Nov. 12, 1952   2 Sheets-Sheet 2
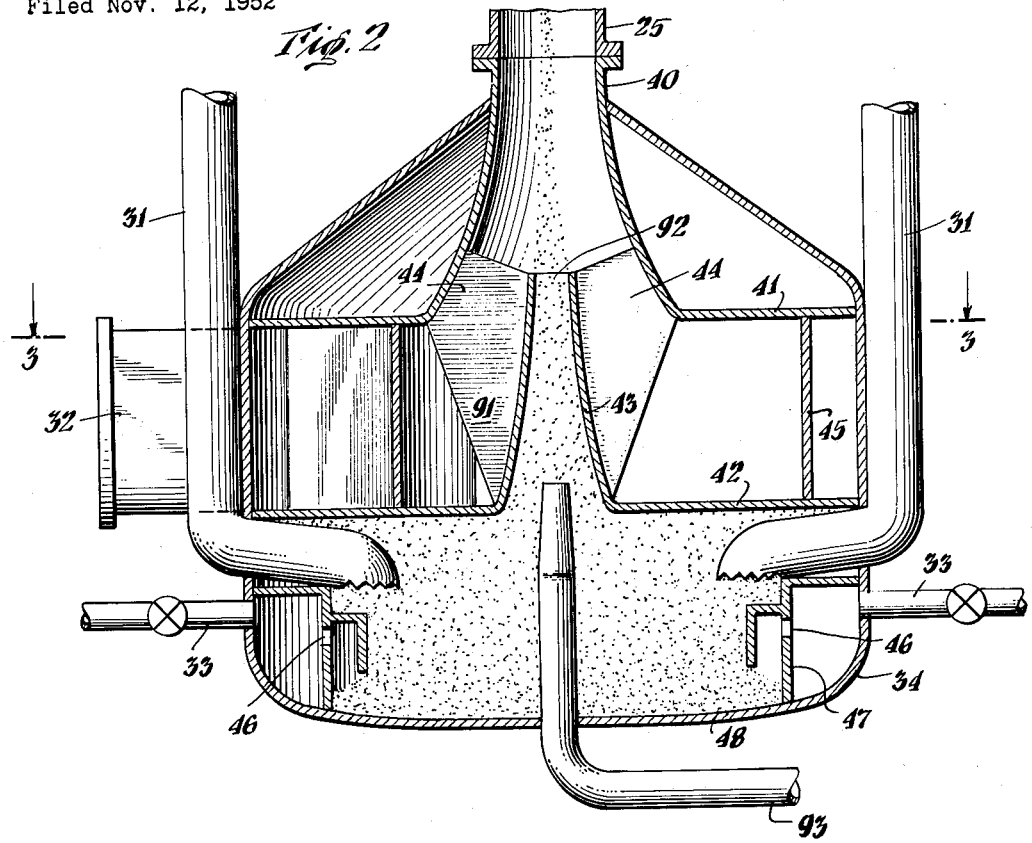
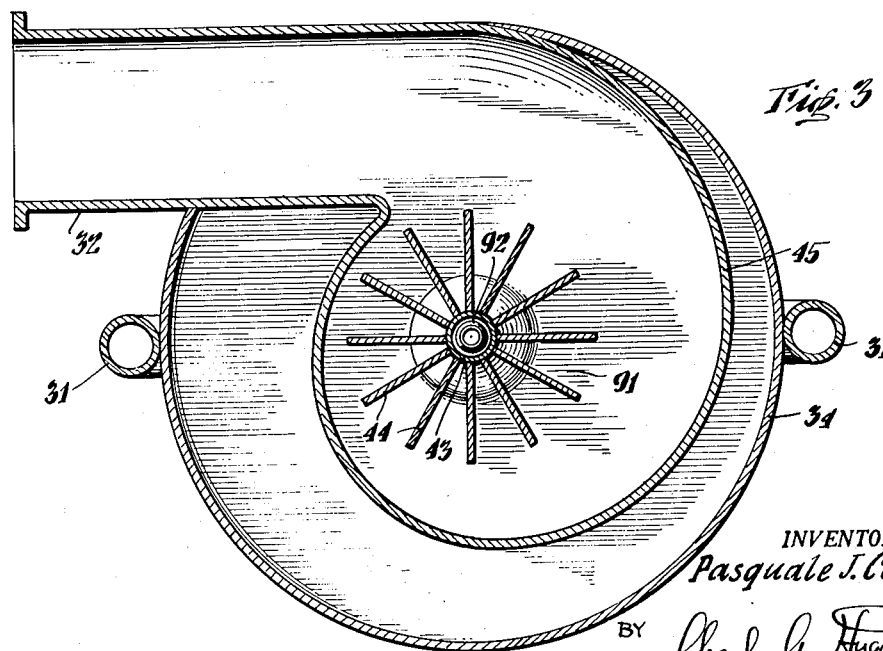
INVENTOR.
Pasquale J. Celani
BY Charles A. Huggett
ATTORNEY

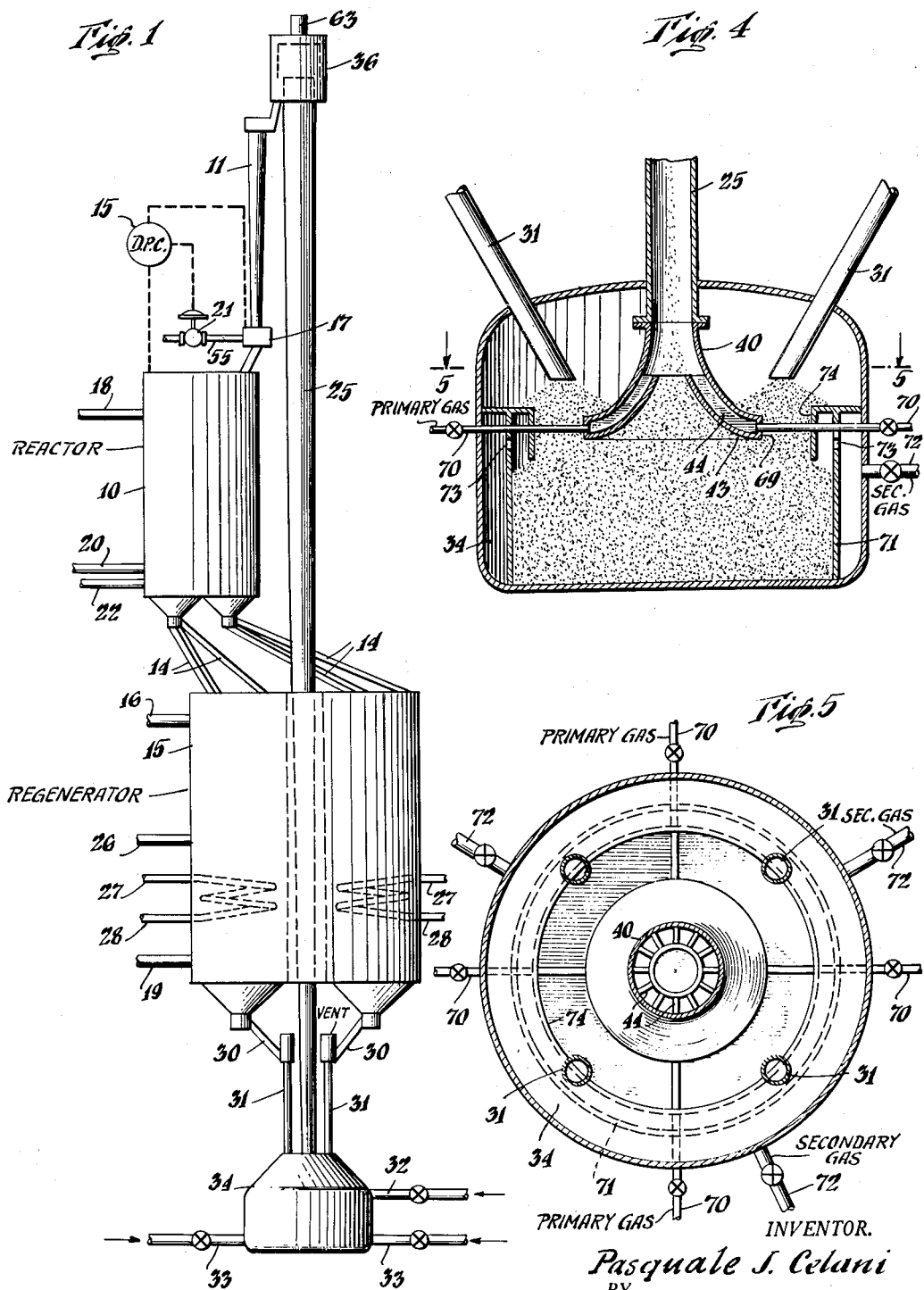

United States Patent Office 2,723,180
Patented Nov. 8, 1955

2,723,180

FEEDING GRANULAR PARTICLES INTO A GAS LIFT

Pasquale J. Celani, River Edge, N. J., assignor to Socony Mobil Oil Company, Inc., a corporation of New York Application November 12, 1952, Serial No. 319,934

4 Claims. (Cl. 23—1)

This invention is directed to the introduction of granular particles into the lower end of a gas lift for upward transfer through the lift in a stream of lift gas. It has particular application in moving bed hydrocarbon conversion processes in which contact material is continuously transferred through reaction and reconditioning zones as compacted gravitating beds and lifted from a low elevation beneath one of the beds to a high elevation above the other bed to complete an enclosed cyclic path.

Various processes utilize solid particulate material as a catalyst or heat carrying material, such as isomerization, cracking, hydrogenation, dehydrogenation, hydroforming, aromatization and alkylation. It is preferable to use a granular material in the size range of about 4–60 mesh Tyler screen analysis. When the particles are inerts used as a heat carrying agent, the size may be larger than 4 mesh Tyler. For catalytic cracking a desirable range is about 4–10 mesh Tyler. It is possible to use particles of either uniform or non-uniform shape. However, pellets, pills or spheres of solid material are preferred. The term "granular" is used to describe particles useful in these processes, being used in a broad sense to cover both uniform and irregular shapes. The granular material is gravitated in substantially compacted form at high temperature through both reaction and regeneration zones. Properly treated hydrocarbons are passed through the void spaces in the bed of solids in the reaction zone to effect the desired conversion. During conversion a contaminant is deposited on the particles of contact material. Air is passed through the bed of solids in the regeneration zone to burn the contaminants from the solids and effect a reheating of the particles.

It is now customary in these processes to withdraw solids from the bottom of one of the zones and pass the particles upwardly through a lift passage in a stream of lift gas to a receiving zone located above the other contacting zone. The particles are gravitated from the receiving zone into the other contacting zone. The contacting zones may be located in side-by-side relationship, although it is preferred that they be located one above the other in order that only a single lift be required.

One form of lift used in these hydrocarbon conversion systems utilized an open-ended, upwardly-directed lift pipe. The lower end of the pipe was projected downwardly into a lift tank and terminated at an elevation intermediate the top and bottom of the tank. Granular particles were introduced into the top of the tank to form a bed of solid particles about the lower end of the pipe. A primary gas pipe was projected upwardly into the bottom of the tank and terminated near the bottom of the pipe, at a level above the surface of the mass of contact material beneath the lift pipe. Most of the lift gas was introduced through this gas pipe which was centrally located with respect to the centerline of the lift pipe, so as to introduce the gas directly into the central region of the pipe. The remaining lift gas was introduced into the bed of contact material around the lift pipe to travel through the mass of solid material to reach the lower edge of the pipe. The particles were directed laterally and upwardly into the pipe by this gas stream, denominated secondary gas, and were mixed with the primary gas in the lower portion of the lift pipe. It has been found that particle collision occurred in the region above the primary gas pipe, causing high attrition at that point. The particles were crowded into a region of reduced cross-section at a location just above the bottom of the lift pipe and forced outwardly, by reason of the upward and outward flow of primary gas, toward the inner wall of the lift pipe. The particles struck the wall with considerable force causing material erosion of the wall surface.

It is an object of this invention to provide an improved gas lift for use in hydrocarbon conversion processes which overcome the above-indicated difficulties of the prior art lift.

It is a further object of this invention to provide improved method and apparatus for feeding granular contact material into a stream of lift gas at the lower end of a lift passage in a moving bed hydrocarbon conversion process.

It is a further object of this invention to provide an improved method and apparatus for feeding granular solid contact material into the lower end of a gas lift with minimum particle attrition.

These and other objects of the invention will be made more apparent in the following detailed description of the invention. The description is keyed to the attached sketches, all highly diagrammatic in form.

Figure 1 is a showing of a moving bed hydrocarbon conversion system which incorporates a gas lift for elevation of the moving contact material.

Figure 2 is a showing, in vertical cross-section, of the lift tank and lower end of the lift pipe of Figure 1.

Figure 3 is a showing, in horizontal cross-section, of the lift tank of Figure 2 as seen on plane 3—3 of Figure 2.

Figure 4 is a showing of a lift tank, in section, which incorporates an alternate embodiment of the invention.

Figure 5 is a showing, in horizontal cross-section, of the lift tank of Figure 4 as seen on plane 5—5 of Figure 4.

In one form of the invention, the contact material is introduced into the lift tank and contacted with a stream of secondary gas which forces the particles to move into the lower end of the lift pipe from an upwardly directed passage which occupies only a central portion of the lift cross-section. The secondary gas is limited to only a small portion of the total lift gas, being just sufficient to effect the movement of the particles into the lift passage. The remainder of the lift gas is introduced into the lower end of the lift passage in the form of an upwardly flowing annular stream about the inner wall of the passage. Thus, the granular solids and lift gas are started upwardly in separate confined streams and at the level where the streams come together in the lift passage, the lift gas issues from a passage which confines it and directs it to the periphery of the lift passage whereas the granular solids issue from a central stream occupying only a central portion of the lift cross-section. The turbulence and lateral flow of the granular particles are minimized in the region above the point where the streams of lift gas and solids merge.

Referring now to Figure 1 for a more detailed description of the invention and its application to a moving bed hydrocarbon conversion process, a combination of a kiln, superposed reactor and a gas lift is shown in a cyclic conversion system. The lift pipe 25 is an elongated open-ended pipe projected upwardly into the bottom of a receiving vessel 36 at its upper end and downwardly into the top of a lift tank 34 at its lower end. The lift pipe is terminated intermediate the top and bottom of these vessels. The bottom of the receiving vessel is connected to the top of the reactor 10 by means of an elongated feed leg 11. The reactor connects with the top of the kiln 15 via the conduits 14 and the bottom of the kiln 15 connects with the top of the lift tank 34 by means of the pipes 30, 31. Primary gas pipe 32 connects into the side of the lift tank 34 and secondary gas pipes 33 connect into the side of the tank at a lower level than pipe 32. A gas discharge pipe 63 is located atop the receiving vessel 36.

In operation a granular contact material is gravitated downwardly in substantially compact columnar form from the receiving vessel down through the feed leg 11, the reactor 10, conduit 14, regenerator 15, conduits 30, 31 into the feed tank 34. In a typical process, such as catalytic cracking, hydrocarbon reactants are introduced into the reactor through the conduit 18 to travel through the void space in the bed of gravitating catalyst. The converted products are withdrawn from the vessel via the conduit 20. The catalyst bed is maintained at a temperature of about 800–1000° F. in the reaction zone and the pressure may be about 5–30 p. s. i. (gauge). An inert seal gas is introduced into the seal leg above the reactor via the seal pot 17 and conduit 55. A differential pressure controller 15 is used to automatically operate the valve 21 in line 55 to maintain the gas pressure in the seal pot just slightly higher than the pressure in the reactor, thereby preventing the escape of reactants up the seal leg. An inert gas is introduced into the bed of contact material via the conduit 22 at a level just below the level at which the products are withdrawn. This gas seals the bottom of the bed, preventing the downward movement of any substantial amount of the product with the gravitating catalyst. During conversion, a contaminant of carbonaceous material is deposited on the catalyst. The catalyst is, therefore, transferred to the bed of gravitating material in the kiln 15 via the conduit 14 where the contaminant is burned from the contact catalyst. Air is introduced into the bed via the conduit 26 and flue gas is removed from the top and bottom of the bed via the conduits 16, 19. The temperature in the regeneration zone is maintained at about 900–1300° F. and the pressure is usually held at about atmospheric. A coolant may be introduced into indirect heat exchange with the solid by passing the cooling medium into the coils via the pipes 27 and out of the coils via the pipes 28. The regenerated contact material is gravitated as substantially compact streams from the bottom of the regeneration zone through conduits 30, 31 to form a compact bed of solids in the lift tank about the lower end of the lift pipe 25. The solids are mixed with a lift gas in the lift tank and conveyed upwardly in a stream of lift gas through the lift pipe 25 to the receiving vessel 36. The particles are separated from the gas in the separator 36 and deposited on the top of the continuous column of catalyst at a level just below the top of the pipe. The gas is discharged from the vessel 36 via the conduit 63.

Referring now to Figures 2 and 3 for a detailed showing of the invention, the lift tank 34 is shown in vertical and horizontal cross-section. The lift pipe 25 has an inlet 40 located at its lower end. The inlet is flared outwardly from top to bottom. A partition 41 is located horizontally across the tank 34 at the level of the lower end of the inlet 40. A second partition 42 is horizontally located a uniform distance below the upper partition 41. A short conduit 43 is projected upwardly from the lower partition 42 into the lower end of the inlet 40. The conduit 43 is of gradually decreasing horizontal cross-section from bottom to top and is centrally located with respect to the vertical centerline of the inlet 40. The conduit and inlet form, therefore, a gas passageway 90 of annular cross-section between the outer wall of the conduit and the inner wall of the inlet. The conduit 43 defines a central passageway 91 through which suspended contact material is discharged upwardly into the central portion of the lift pipe. The inlet may be a part of the lift pipe instead of a separate member. When the term "lift pipe" or "lower end of the lift pipe" is used in claiming this invention, therefore, the term is intended to include the inlet in those instances where a separate inlet is used. A multiplicity of flat vanes 44 are arranged in a radial pattern about the conduit 43 between the conduit 43 and the inlet 40. The vanes are vertically disposed and are uniformly distributed about the pipe 43. A vertical wall 45 between the upper and lower partition plates 41, 42 is curved in the shape of a volute spiral about the interior of the vessel 34. The wall 45 is designed to provide a primary gas flow path about the lower end of the lift pipe of decreasing horizontal thickness. The primary gas pipe 32 is horizontally attached to the vessel at the level between the upper and lower partition plates. The primary pipe is attached tangentially to the lift tank wall at the location where the thickness of the spiral passage is maximum, viz. where the wall 45 attaches to the inner wall of the lift tank 34. This arrangement is shown more clearly on Figure 3. The spiral passage supplies the primary gas uniformly about the pipe. The straightening vanes 44 take the spiral motion out of the flowing gas stream and direct the gas upwardly into the lift pipe. The gas is introduced from an annular passage into the lift pipe. The granular contact material is introduced into the lift tank through the legs 31, 31 to form a bed of contact material on the floor of the vessel beneath the lower partition plate 41. A ring manifold 45 is located in the bottom of the vessel 34 about the wall of the vessel. A multiplicity of holes 46 are located uniformly about the manifold 47. A deflecting baffle 48 is located above the holes in the ring manifold to direct the gas admitted through the holes downwardly toward the bed of contact material in the bottom of the vessel. Secondary air is introduced into the manifold through the pipes 33 attached about the lower portion of the lift tank. The secondary gas passes through the mass of solids in the bottom of the vessel and forces the solids up through the passageway 43 into the central portion of the lift inlet 40. When additional secondary gas is needed to drive the contact material through the passageway 43, it can be supplied through the conduit 49, which is projected upwardly into the bottom of the vessel and terminated in the lower end of the passageway 43.

Referring now to Figures 4 and 5, an alternate embodiment of the invention is shown. The flared inlet 40 is attached to the lower end of the lift pipe 25. A flared passageway 43 is located a spaced distance beneath the inlet, leaving a passage between the two flared members for introduction of primary gas into the lift pipe. A ring 69 is located about the bottom ends of the flared members to seal the passage at its lower end. Gas is introduced laterally into the bottom of the passage through conduits 70 which project laterally into the tank 34 and through the ring 69. The pipes 31 project downwardly into the lift tank and are terminated at a level above the bottom of the inlet 40, so as to provide a mass of solids about the lower end of the lift inlet 40. The vertically mounted vanes 44 are arranged radially about the inlet 40, being supported between the member 43 and the inlet 40. The ring manifold 71 is located in the bottom of the tank. Secondary gas is introduced into the manifold 71 via the pipes 72 and the gas is passed through orifices 73 in the inner wall of the manifold to enter the bed of solids in the tank. Deflecting baffle 74 is located on the inner wall of the manifold so as to shield the orifices 73. The secondary gas is introduced beneath the baffle 74 and directed downwardly thereby into the bed of solids. The gas travels through the bed, pushing contact material through the passageway 43 into the center of the lift pipe 25. The solids mix with the annular stream of primary lift gas in the lower end of the lift and travel through the lift pipe 25 to the receiving vessel at the top thereof.

As an example of the invention, a lift tank, similar to the one shown on Figures 2 and 3, for a lift pipe having a diameter of 25⅝ inches has the following dimensions:

| | |
|---|---|
| Diameter of tank inches | 92 |
| Distance of lower partition from bottom do | 36 |
| Distance of upper from lower partition do | 32 |
| Diameter of upper end of member 43 do | 21 |
| Diameter of lower end of member 43 do | 36 |
| Diameter of inlet 40 at level of upper end of member 43 inches | 36 |
| Diameter of inlet 40 at lower end thereof do | 48 |
| Primary air inlet area square inches | 755 |
| Catalyst and secondary air inlet area do | 334 |
| Diameter of auxiliary secondary pipe inches | 8 |
| Distance auxiliary secondary pipe projects into the member 43 inches | 8 |
| No. of secondary air pipes 33 | 4 |
| No. of conduits 31 | 8 |

This invention is not intended to be limited to the specific embodiments shown above, being broad in its application and intended to cover all changes and modifications of the examples of the invention herein chosen for purposes of disclosure, which do not constitute departures from the spirit and scope of the invention.

I claim:

1. Improved apparatus for feeding contact material and lift gas into the lower end of an open-ended, upwardly directed gas lift pipe through which the contact material is lifted from one level to a higher level in a stream of rising lift gas, which comprises in combination: a lift tank located about the bottom of the lift pipe, the lift pipe being terminated at its lower end intermediate the top and bottom of the pipe, the lower end of the lift pipe being flared outwardly, a short vertical open-ended conduit, flared outwardly from top to bottom, said conduit being located co-axially with the lift pipe and a spaced distance therebelow, so as to define a passageway of annular horizontal cross-section between the outer wall of said conduit and the inner wall of the lower end of said lift pipe, a ring attached at its upper edge to the bottom of the lift pipe and at its lower edge to the bottom of the short conduit, a multiplicity of substantially horizontal primary gas pipes projected into said lift tank and through said ring from locations uniformly distributed about the exterior of the tank, means for introducing contact material into said lift tank at an elevation above the lower end of the lift pipe, a circular manifold in the lower portion of said lift tank, means defining a multiplicity of orifices about the interior of said manifold, and conduit means attached to said lift tank and in communication with said manifold for introducing secondary lift gas into said manifold.

2. Improved apparatus for feeding contact material and lift gas into the lower end of an open-ended, upwardly extending gas lift pipe through which the contact material is lifted from one level to a higher level in a stream of rising lift gas which comprises in combination: a lift tank located about the bottom of the lift pipe, the lower portion of the lift pipe being substantially vertical and terminated in an outwardly flared inlet portion intermediate the top and bottom of the lift tank, a short vertical open-ended conduit, flared outwardly from top to bottom, said conduit being located co-axially with the lift pipe, the lower end being terminated a short distance below the pipe and the upper end being terminated a short distance within the inlet of the pipe, so as to define a passageway of annular horizontal cross-section between the outer wall of said short conduit and the inner wall of the lower end of said lift pipe, the cross-section and direction of said passageway changing gradually to prevent disruption of gas flowing therethrough, a ring member attached at its upper edge to the bottom of said lift pipe inlet, and at its lower edge to the bottom of said short conduit, conduit means for feeding gas substantially horizontally through said ring member, conduit means for gravitating contact material projected downwardly into said lift tank and terminated intermediate the top and bottom of the tank, and secondary gas inlet means in said tank, for introducing gas into the contact material to transfer contact material through said short conduit.

3. Improved apparatus for feeding contact material and lift gas into the lower end of an open-ended, upwardly extending gas lift pipe through which the contact material is lifted from one level to a higher level in a stream of rising lift gas which comprises in combination: a lift tank located about the bottom of the lift pipe, the lower portion of the lift pipe being substantially vertical and terminated in an outwardly flared inlet portion intermediate the top and bottom of the lift tank, a short vertical open-ended conduit, flared outwardly from top to bottom, said conduit being located co-axially with the lift pipe, the lower end being terminated a short distance below the pipe and the upper end being terminated a short distance within the inlet of the pipe, so as to define a passageway of annular horizontal cross-section between the outer wall of said short conduit and the inner wall of said inlet portion of the lift pipe, the cross-section and direction of said passageway changing gradually to prevent disruption of gas flowing therethrough, a first partition horizontally located across said tank attached to the lower end of said lift pipe inlet, a second partition horizontally located across said tank below said first partition attached to the lower end of said short passageway, and a vertical wall in said lift tank located between the first and second partition and curved, in a horizontal plane, in the shape of a volute spiral, a horizontal primary gas pipe projected through the side of said lift tank and attached tangentially to said vertical wall and said upper and lower partitions, so as to provide flowing gas smoothly to the lower end of said lift pipe inlet, a multiplicity of vertical vanes located between the short conduit and the lift pipe inlet, being arranged uniformly about the short conduit, so as to remove spiral motion from the gas entering the lower end of the lift pipe, conduit means for gravitating contact material projected downwardly into said lift tank and terminated intermediate the top and bottom of the tank, and secondary gas inlet means in said tank, for introducing gas into the contact material to transfer contact material through said short conduit.

4. In a process wherein a granular contact material is transferred in a stream of lift gas from one level to a higher level through an upwardly extending lift passage comprising: supplying a major portion of the lift gas around the periphery of the lower end of the lift passage, along a smooth curved path, so as to convert the direction of the gas flow from horizontal to vertical without turbulence, confining said stream of gas to an annular space around the inner wall of the lift passage, supplying contact material suspended in a minor portion of the lift gas upwardly into the lift as a confined stream through a short confining central passage, discharging the suspended contact material from the passage into the central portion of the lift cross-section, so as to mix with the annular stream of gas discharging into the surrounding peripheral portion of the lift passage, at a level where the annular stream of gas has a horizontal force component which tends to prevent particles from striking the inner wall of the lift passage, and conveying the particles upwardly through the passage in the commingled streams of lift gas with minimum attrition.

References Cited in the file of this patent

UNITED STATES PATENTS

| | | |
|---|---|---|
| 2,600,528 | Grace, Jr. | June 17, 1952 |
| 2,610,093 | Bergman | Sept. 9, 1952 |
| 2,625,442 | Kollgaard | Jan. 13, 1953 |
| 2,666,731 | Bergstrom | Jan. 19, 1954 |